United States Patent
Neumaier et al.

(10) Patent No.: US 11,760,391 B2
(45) Date of Patent: Sep. 19, 2023

(54) INTELLIGENT TRANSPORTATION SYSTEM AND METHOD

(71) Applicant: SWIFT Rails LLC, Lancaster, NY (US)

(72) Inventors: Kevin Neumaier, Lancaster, NY (US); James Enright, Lancaster, NY (US)

(73) Assignee: SWIFT Rails LLC, Lancaster, NY (US)

(*) Notice: Subject to any disclaimer, the term of this patent is extended or adjusted under 35 U.S.C. 154(b) by 656 days.

(21) Appl. No.: 16/759,308

(22) PCT Filed: Oct. 25, 2018

(86) PCT No.: PCT/US2018/057506
§ 371 (c)(1),
(2) Date: Apr. 24, 2020

(87) PCT Pub. No.: WO2019/084265
PCT Pub. Date: May 2, 2019

(65) Prior Publication Data
US 2021/0253138 A1  Aug. 19, 2021

Related U.S. Application Data

(60) Provisional application No. 62/576,676, filed on Oct. 25, 2017.

(51) Int. Cl.
*B61B 5/02* (2006.01)
*B61L 25/02* (2006.01)

(52) U.S. Cl.
CPC ............. *B61B 5/02* (2013.01); *B61L 25/025* (2013.01)

(58) Field of Classification Search
CPC .... B60W 40/105; B60W 10/18; B60W 60/00; G06T 7/70; G06T 7/50
See application file for complete search history.

(56) References Cited

U.S. PATENT DOCUMENTS 3,670,659 A  6/1972 Schurch
3,774,544 A  11/1973 Mouillon
(Continued)

FOREIGN PATENT DOCUMENTS

CN  1772541 B  7/2012
CN  203191994 U  9/2013
(Continued)

OTHER PUBLICATIONS

International Searching Authority, International Search Report and Written Opinion for International Application No. PCT/US18/57506, dated Jan. 11, 2019.
(Continued)

*Primary Examiner* — Iqbal Zaidi
(74) *Attorney, Agent, or Firm* — Harter Secrest & Emery LLP; Michael J. Berchou; Jacob D. Merrill

(57) ABSTRACT

Presented are a transportation system apparatus and method of operation. An exemplary transportation system includes an elevated track and a vehicle coupled with and operable to traverse the elevated track. Additionally, the transportation system includes a first elevated track loop wherein the vehicle is operable at a first speed, a second elevated track loop operable to receive the vehicle merging from the first elevated track loop, wherein the vehicle is operable at a second speed, and an elevated track section operable to receive the vehicle merging from the second elevated track loop, wherein the vehicle is operable at a third speed.

14 Claims, 12 Drawing Sheets

(56) References Cited

U.S. PATENT DOCUMENTS

| | | | |
|---|---|---|---|
| 4,841,871 A | 6/1989 | Leibowitz | |
| 5,797,330 A | 8/1998 | Li | |
| 6,276,542 B1 | 8/2001 | McCrary | |
| 6,318,274 B1 | 11/2001 | Park | |
| 6,389,982 B1 | 5/2002 | Evensen | |
| 8,375,865 B2 | 2/2013 | Zayas | |
| 9,802,633 B1 * | 10/2017 | Nishinaga | G08G 1/20 |
| 2009/0235839 A1 | 9/2009 | Stahn | |
| 2010/0163688 A1 | 7/2010 | Blum | |
| 2010/0307368 A1 | 12/2010 | Parsley | |
| 2011/0125350 A1 | 5/2011 | Won | |
| 2012/0055367 A1 * | 3/2012 | Zayas | B61B 3/00 104/88.01 |
| 2019/0389019 A1 * | 12/2019 | Sticht | B65G 17/32 |

FOREIGN PATENT DOCUMENTS

| | | |
|---|---|---|
| CN | 203381623 U | 1/2014 |
| CN | 106274916 A | 1/2017 |
| CN | 106809223 A | 6/2017 |
| DE | 3341787 A1 | 5/1984 |
| KR | 20020034807 A | 5/2002 |
| WO | 8704676 A1 | 8/1987 |

OTHER PUBLICATIONS

European Patent Office, Partial Supplementary European Search Report for EP Application No. 18871438.0, dated Jul. 5, 2021.
European Patent Office, Extended Supplementary European Search Report for EP Application No. 18871438.0, dated Jan. 10, 2022.

* cited by examiner

INTELLIGENT TRANSPORTATION SYSTEM AND METHOD

BACKGROUND

The present disclosure relates generally to a transportation system and, more specifically, to a low cost, safe, fast, and sustainable form of transportation to move people and freight. The transportation system may sometimes be referred to herein as "SWIFT Rails."

Convenience in mobility is often defined as the ability to get from one spot to the next in the shortest time. While there has typically been an evolutionary improvement in mobility, the current systems have reached limits at where they begin to slow down. Travel times are increasing with congestion. The average commuter in the United States spends 42 hours a year stuck in traffic. In some cities globally, it is substantially worse. The present disclosure improves or solves, inter alia, traffic congestion several ways and allows riders to reach their destinations quicker.

People residing in the United States spend approximately 1/7 of their income on transportation. While mobility is greatly valued, cost is a significant factor in the form and extent of that mobility. It would not be possible, for example, to install a traditional mass transit system that costs 10 times more than current systems, as this would exceed the total dollars available to be spent on everything. The cost of a new type of transportation system must be at, or lower than, existing systems for wide scale adoption. The present disclosure provides, inter alia, a transportation system that is substantially less expensive to build, operate and maintain than current transportation systems such as automobiles/roadways and light rail.

SUMMARY

The present disclosure provides for a transportation system and method of operating same. In one exemplary embodiment, a transportation system includes an elevated track having a plurality of posts, at least two track members disposed in parallel, a plurality of cross members transversely disposed and coupled between the track members, a plurality of reinforcing cross members transversely disposed and coupled between the track members operative to support the track members on the plurality of posts, and a support member disposed between the plurality of posts and the plurality of reinforcing cross members, wherein the support member comprises a beam disposed parallel with the track members. In other aspects, the system includes a vehicle coupled with and operable to traverse the elevated track. Additionally, the system includes a first elevated track loop wherein the vehicle is operable at a first speed, a second elevated track loop operable to receive the vehicle merging from the first elevated track loop, wherein the vehicle is operable at a second speed, and an elevated track section operable to receive the vehicle merging from the second elevated track loop, wherein the vehicle is operable at a third speed.

In a second exemplary embodiment, a method of operating a transportation system includes providing a first vehicle coupled with and operable to traverse an elevated track, wherein the first vehicle includes an on-board contactless speed sensor and the elevated track includes a plurality of contactless speed sensors. The method further includes providing a second vehicle coupled with and operable to traverse the elevated track, wherein the second vehicle includes an on-board contactless speed sensor. Additionally, in certain embodiments the method includes providing a first elevated track loop wherein the first and second vehicles are operable at a first speed. Further, the method may include providing a second elevated track loop operable to receive the first and second vehicles merging from the first elevated track loop, wherein the first and second vehicles are operable at a second speed, and providing an elevated track section operable to receive the first and second vehicles merging from the second elevated track loop, wherein the first and second vehicles are operable at a third speed. In another aspect, the method includes comparing a speed signal from the first vehicle contactless on-board speed sensor with a speed signal from the track contactless speed sensors, comparing a speed signal from the second vehicle contactless on-board speed sensor with a speed signal from the track contactless speed sensors, and reducing a speed of the second vehicle where the first vehicle speed has decelerated beneath a predetermined speed to maintain a predetermined distance between the first and second vehicles.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION OF THE PREFERRED EMBODIMENTS

Figure 1:
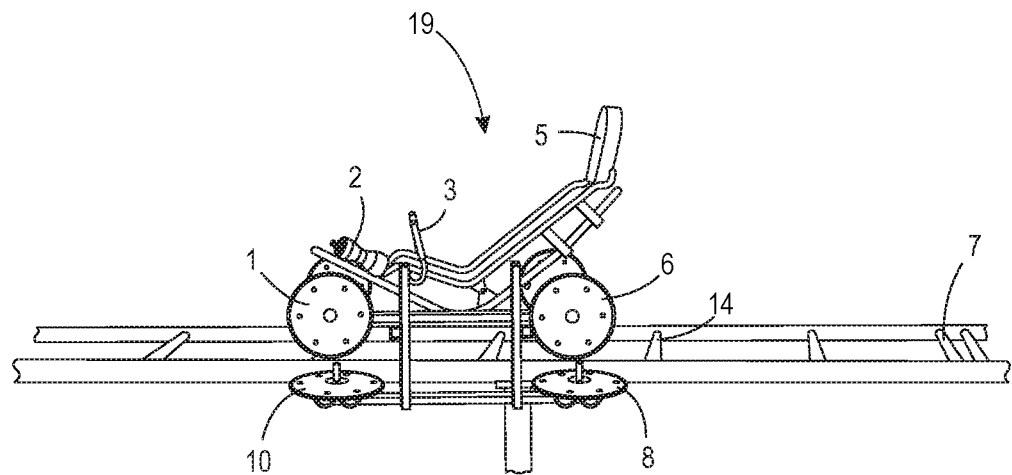
FIG. 1 illustrates an embodiment of a SWIFT Rails vehicle unfaired.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application. As used in the following specification, terms of orientation such as "horizontal," "vertical," "left," "right," "up," and "down," as well as adjectival and adverbial derivatives thereof, (e.g., "horizontally," "rightwardly," "upwardly," etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

With reference to the corresponding parts, portions, or surfaces of the disclosed embodiments, merely for the purposes of illustration and not by way of limitation, the present disclosure provides a novel transportation system which includes a light weight, aerodynamic vehicle running on a lightweight track or rail suspended in the air. The vehicle is driverless and communicates with the track, other vehicles running on the track, and overall/central and zoned computer systems. The track is "intelligent" in that, among other things, together with the vehicle and the zonal and overall computer systems, the track switches the vehicle to a desired destination.

One aspect of the present disclosure provides a chain of feedback loops that make the system both low cost and sustainable. In another aspect, the vehicles are lightweight and, because they are driverless and callable, they can be designed for their purpose (as described herein) instead of every purpose—thus reducing weight and cost. Because each vehicle is lightweight, the track tubing utilized to support the vehicles may be thinner, reducing both cost and weight. Because the track and vehicles are lightweight, the posts utilized to elevate the track may be made out of less steel than the posts of a conventional rail system, reducing costs. Because the vehicles are lightweight, aerodynamic, and have low rolling resistance, they use less energy and can travel further on an electric charge. Because the vehicles are more efficient, they can use a lower horsepower electric motor and a smaller battery, which reduces both weight and cost. Because the track is lighter weight, the switches can be lighter weight which enables the motor to flip switches to be smaller and more efficient. Because the vehicles are all computer controlled and scheduled for speed, they rarely need to brake, making them more efficient. Because the vehicles typically employ regenerative braking they rarely need friction braking, putting less wear on the vehicles and the track—further reducing the cost of the system.

Figure 2:
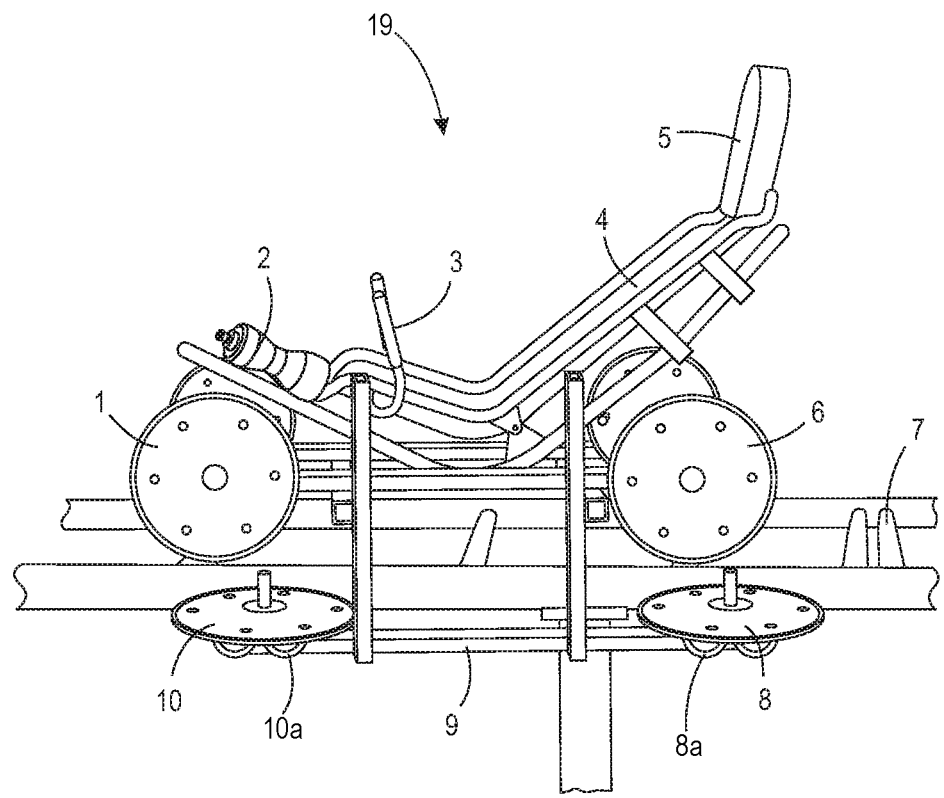
FIG. 2 illustrates an embodiment of how the vehicle's wheels are secured to a track/rail.

As illustrated in FIGS. 1 and 2, in an embodiment, a SWIFT Rails vehicle 19 may include top front wheels 1, top rear wheels 6, front side wheels 10, and rear side wheels 8. The top front wheels 1 and the top rear wheels 6 rest on an upper portion of the track 7. In an embodiment, the top rear wheels 6 may receive drive torque from a power source (not depicted). In another embodiment, the top front wheels 1 may receive drive torque the power source. In yet another embodiment, the top rear wheels 6 and the top front wheels 1 may both receive drive torque from the power source. The power source may be, but is not limited to, an electric motor or an internal combustion engine.

Additionally, the top front wheels 1 may be secured to a track 7 to prevent the SWIFT Rails vehicle 19 from coming off the track 7. In an embodiment, the SWIFT Rails vehicle 19 may also include underside safety wheels 8a, 10a located below the rear side wheels 8 and the front side wheels 10. The underside safety wheels 8a, 10a are mounted to a track portion 9 and capable of rolling thereon. Braking and gearing levers 3 may also be included for vehicle 19 testing and human operated vehicle 19 applications. In addition, the track 7 may include track cross members 14.

Together the front and rear top wheels 1, 6, the side wheels 8, 10, and the underside safety wheels keep the vehicle 19 attached to the track 7 in a wide variety of conditions. Connected to the vehicle 19 frame and undercarriage, the wheels 1, 6, 8, 8a, 10, 10a act together to move the vehicle 19 forward along straight sections, track curves, inclines, and declines.

With continued reference to FIGS. 1 and 2, in an embodiment, the SWIFT Rails vehicle 19 may include a seat 4 disposed at a reclined angle to reduce a frontal cross-sectional area of the vehicle 19 when faired and for the comfort of passengers. A headrest 5 and front drink holder 2 may also be included.

In an embodiment, the track 7 may be manufactured, at least in part, from steel. Very low rolling resistance is achieved on the steel track 7 with hard wheels and quality bearings. The wheels 1, 6, 8, 8a, 10, 10a may be made of steel, a composite material with a high degree of hardness, or any other suitable material.

In the embodiment illustrated in FIGS. 1 and 2, the rider sits comfortably in a reclined position. This embodiment of the vehicle 19 weighs less than 100 pounds. With a 200 pound rider, the vehicle 19 can be pushed/moved with as little as 5 pounds of force. The vehicle 19 can move forward at different speeds and also backward for parking applications. Parking can occur in a train roundhouse style design or the vehicles 19 can be conveyed together with a piece of track 7 equal to or greater than the length of the vehicle 19. In one embodiment, the vehicles 19 will have frames made from lightweight tubular steel, aluminum or carbon fiber. Batteries may be of lithium ion or similar high density battery design. The aerodynamic fairing will be made of carbon fiber, fiberglass, or similar light weight material. The rider will typically sit in a recumbent position in many applications. The aerodynamic shape (as in the embodiment in FIG. 3) will have a small frontal area and a shape that has low drag coefficient, typically below 0.1.

In one embodiment, vehicles 19 fit the width dimensions of the track which allow for a comfortable single seated person. In another embodiment, two-person vehicles 19 include passenger seating in tandem. Larger vehicles 19 for three or four passengers include passenger seating one behind another. Vehicles 19 for disabled or impaired persons, or any other special use, are employed using the maximum width and maintaining aerodynamics. The vehicles 19 are driverless, allowing for a wide variety of seat positions. For long trips, a sleeping vehicle 19 with a bed could be used. A variety of entertainment options and office features can be built into special purpose vehicles 19. In an embodiment, exercise equipment may be built into a vehicle 19. Vehicles 19 may also be linked together to achieve group transportation needs, couple large luggage with passengers, or to provide extremely high-density application where groups are all traveling to a certain location at a certain time, such as a large sporting event or concert.

Figure 3:
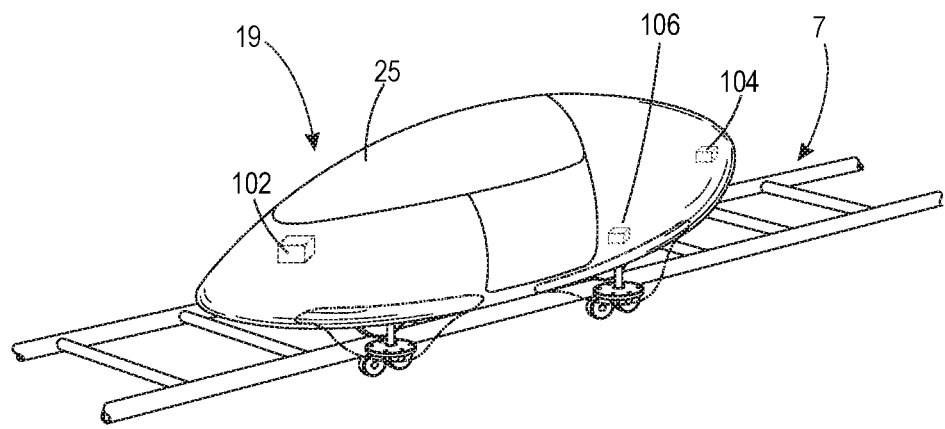
FIG. 3 illustrates an embodiment of the vehicle as it would run on the track or rail.

FIG. 3 is an illustration of the vehicle 19 having a windshield 25 as it would run on the track or rail 7. The wheels 1, 6, 8, 8a, 10, 10a in this example are shown unfaired to highlight how they attach and lock the vehicle 19 to the track 7. In an embodiment, the SWIFT Rails vehicle 19 is lightweight and aerodynamic. The reduced weight of the SWIFT Rails vehicle 19 as compared to conventional light rail cars is important, as the weight of the vehicle 19 determines the necessary strength of the track 7 and the power of the vehicle 19. The combination of a lightweight and aerodynamic vehicle 19 having low rolling resistance allows the vehicle 19 to attain excellent efficiency—which may be in excess of 1,000 mpg equivalent in some embodiments. Because the vehicle 19 is efficient, it reduces the size and weight of the required battery dramatically, keeping both the weight and the cost low. The low rolling resistance, low weight and aerodynamic nature of the vehicle 19 allows for high top speeds (which may be greater than 100 mph in some embodiments) and acceptable acceleration with relatively low cost and light weight motors (in less than 10 HP range).

The design of the transportation system and the rules governing its operation define the weight of the vehicle 19. The system design eliminates vehicle 19 components in addition to just making them lighter with lightweight materials. For example, the vehicle 19 does not need a steering mechanism, so it does not have the weight (or cost) associated with steering components. SWIFT Rails designed safety into the system rather than the vehicle 19, again eliminating components and making the design light weight. Because the vehicles 19 run one way on a track, they cannot collide or go off the track, therefore the vehicles 19 do not require elaborate and heavy crash protection.

The term "light weight" as used herein means that the weight ratio of passenger to vehicle 19 is reduced with respect to other modes of transportation. For example, a person weighing 150 pounds can be transported quickly, safely, and comfortably with a 150 pound vehicle 19. Here the passenger to vehicle 19 ratio is 1:1. In an average size U.S. automobile of 4000 pounds, there is a single occupant 85% of the time. In a U.S. automobile the passenger to vehicle 19 ratio for the most common case (single occupant) is 1:26.7. Another common mode of transportation, light rail, has similar metrics. The Siemens S70 is a popular light rail vehicle 19 that weighs 95,000 pounds empty and can hold up to 149 people. Assuming a high passenger occupancy (90% capacity), the Siemens S70 has a passenger to vehicle 19 ratio of 1:4.7. SWIFT Rails is a number of times lighter in weight than other known transportation systems, but still provides considerable personal space and can be switched point to point like an automobile.

The passenger to vehicle 19 ratio is a comparison of efficiency and with it the force required for acceleration. In developing a complete transportation system, the total weight of passenger plus vehicle 19 is important as it is this combined weight that needs to be supported by the road or rail. The combination of the SWIFT Rails passenger plus vehicle 19 is 300 pounds. The combination of a person plus the average car is 4150 pounds, and the combination of the Siemens S70 and passengers at 90% capacity is 115,100 pounds. Compared to the automobile system, SWIFT Rails is 14 times lighter weight, and compared to the Siemens S70 light rail vehicle 19, SWIFT Rails is 383 times lighter weight.

In the case of the average car, the roadway must be designed not for the average car, but rather the heaviest vehicle 19 on the road. The heaviest vehicle 19 for the road is typically a fully loaded truck, which may have a weight of 120,000 pounds. The combined weight of the fully loaded truck with the average driver is 120,150 pounds. The SWIFT Rails system is 400 times lighter than the fully loaded truck with driver. In this case, the combination of a lightweight vehicle 19 plus passenger impacts the system roadway and railway.

SWIFT Rails combines vehicle 19, track, and system rules that lead to extraordinary unpredictable results. Further, because the SWIFT Rails system is so much lighter, design choices are much different. SWIFT Rails can be inexpensively elevated, which allows it to be built over other modes of transportation.

SWIFT Rails represents an intelligent transportation system in which all aspects of transportation are controlled by the system. In order to achieve a practical system, SWIFT Rails combines engineering with IT to create a super intelligent transportation system that is not as computationally intensive as might be expected. The basis of SWIFT Rails imposes the following conditions, in individual embodiments or in concert, which greatly simplify many interactions, namely: (i) vehicles 19 are driverless, (ii) vehicles 19 do not turn, they are routed by intelligent switching, (iii) vehicles 19 can only be moved forward (except for parking type situations), (iv) switches are either straight or a turn (some parking switches allow more directions), (v) there are no intersections except for switches, (vi) the vehicles 19 do not intersect other modes of transportation (typically by elevating the track), and (vii) curves are banked and have a designed speed associated with their radius of curvature.

The basis of SWIFT Rails creates the following conditions that need to be controlled for optimum routing and safety: (a) vehicles 19 can go forward from zero mph to top speed, (b) switches turn vehicles 19—they are straight or turned, (c) the app or computer that interfaces with a passenger needs to work with the larger system to determine which vehicle 19 they will board, at what location, and the location of their end destination, (d) all vehicles 19 go the same speed on the same sections of track—the system can vary these speeds slightly for better switching and traffic flow, (e) monitoring computers keep track of vehicle 19 locations to see if they are running according to plan and make changes when needed.

The system is orders of magnitude simpler computationally than an automatic driving automobile. Routing in a static condition is relatively simple; however, in a moving system it is not fully apparent what things are most important to test and what things need to be given the greatest priority.

SWIFT Rails' combination of vehicles 19, track, and system rules simultaneously provide safety, sustainability, convenience, low environmental footprint and cost-effectiveness. SWIFT Rails achieves safety by a combination of design, system rules, and operations. SWIFT Rails is theoretically able to have close to zero accidents. With an elevated track, instead of at grade intersections, collisions with other forms of transportation, pedestrians, and most animals are eliminated. SWIFT Rail vehicles 19 travel only in one direction and are attached to the rails. It is impossible to have head on collisions or to drive off the road. All vehicles 19 are controlled by the system, so collisions due to unexpected behavior of other drivers are eliminated. The majority of all collisions are eliminated and those possible collisions should be eliminated or greatly reduced with system controls and redundancies, as described herein.

SWIFT Rails combination of design, system rules and operation provides sustainability. The energy consumption from transportation globally continues to go up as the number of cars and trucks and passenger mile per car and truck continue to increase. There exist cars that have achieved a high degree of energy efficiency; however, they are not safe to operate with other cars and trucks as they have issues with stability, speed, steering, and interaction with other larger cars and trucks. SWIFT Rails delivers vehicles 19 that propel riders at up to 1,000 miles per gallon equivalent, greatly improving efficiency. The all electric vehicles 19 can be powered with renewable energy and be zero emission—achieving full sustainability.

Existing surface transportation divides ecosystems from a wildlife point of view; from an urban planning point of view surface transportation divides neighborhoods; and from a watershed point of view surface transportation can cause numerous problems in changing water flow. Surface transportation uses considerable real estate and takes substantial resources to create roadways or railways. SWIFT Rails elevates the track, creating a very small environmental footprint and freeing up substantial land below the system. This ability to cost effectively elevate the track also allows SWIFT Rails to avoid intersections with itself and other forms of transportation—greatly improving safety. Each SWIFT Rails vehicle 19 goes from its start to destination typically never stopping. While a car will typically stop at crossroads and stop signs, SWIFT Rails vehicles 19 only merge. This makes vehicles 19 more efficient as energy use consumed in braking and accelerating is reduced.

In one embodiment of the present disclosure, the vehicles 19 are designed for single occupant trips/single occupant rider. This is the lightest, lowest cost, and most efficient vehicle 19. The vehicles 19 are callable; the rider communicates to the central or zonal computer via smartphone or other device to schedule their pickup and drop off, as described in more detail below. Many variations of the vehicles 19 are possible and special uses can be deployed as long as they fit the weight requirements and have aerodynamic shapes and motors required to perform adequately on the system.

Figure 4:
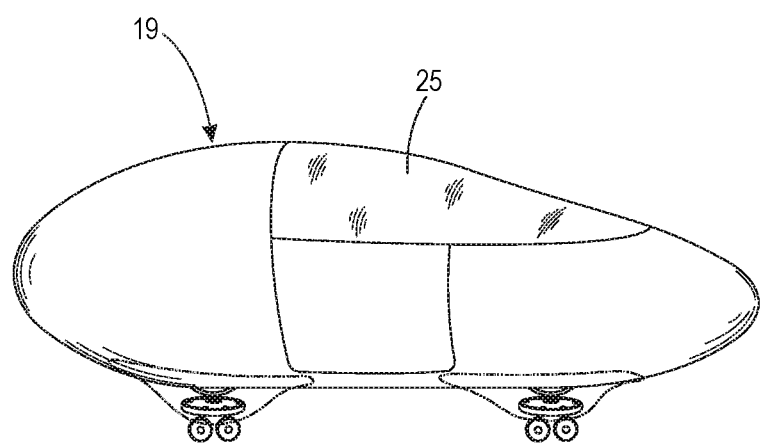
FIG. 4 illustrates a side view of an embodiment of the aerodynamic nature of the vehicle fairing.

FIG. 4 illustrates a side view of the aerodynamic nature of the fairing covering the main body of each of the vehicles 19. Fairings are created out of carbon fiber, fiberglass, or other lightweight materials.

Figure 5:
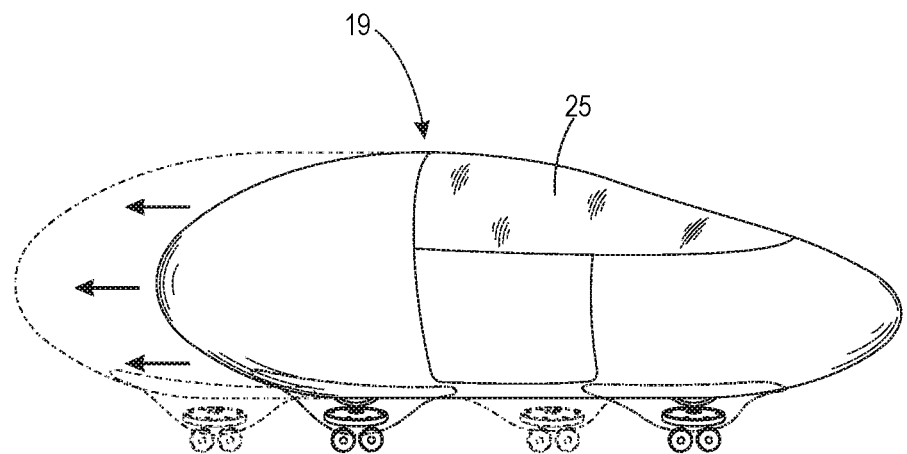
FIG. 5 illustrates an embodiment of a vehicle design to accommodate a variety of uses via extended length.

FIG. 5 illustrates a vehicle 19 design which can accommodate a variety of uses by extending the vehicle 19 length, as shown by the arrows. By lengthening the vehicle 19, it is possible to put multiple riders in tandem, allow for extra storage space, or a number of other uses. The vehicle 19 is configured to meet track weight guidelines.

All vehicles 19 will be tracked along the system and have a unique system identification ("ID"). Redundancy of vehicle 19 location can be achieved with track location sensors 100, vehicle 19 mounted GPS sensors/receivers 102, and the sensors 104 of other vehicles 19 which will identify the presence of other vehicles 19. Vehicle 19 spacing can be maintained by both the system and the individual vehicles 19 themselves if they get too close to one another. Emergency vehicles 19 and other vehicles 19 may be granted priority on the system.

In one embodiment of the novel transportation system, all vehicles 19 travel at the same speed (with variations controlled to allow speed up and slow down for aid in traffic flow and switching). Traffic congestion does not exist except as might be possible due to a partial shutdown or emergency.

Lightweight freight may be moved on the novel system as well. The total vehicle 19 weight and aerodynamics of the vehicle 19 need to be maintained so that that the vehicle 19 can travel at the same speed as the other vehicles 19, thereby maintaining the speed of the system. Delivery of small packages can be achieved with the use of a robotic arm or conveyance device within the vehicle 19. Delivery of larger items may be handled via special use vehicles 19. For example, a special use vehicle 19 may be utilized by a manufacturer/distributor to deliver refrigerators, where the vehicle 19 contains both the refrigerator and a built-in dolly or other cart.

Figure 6:
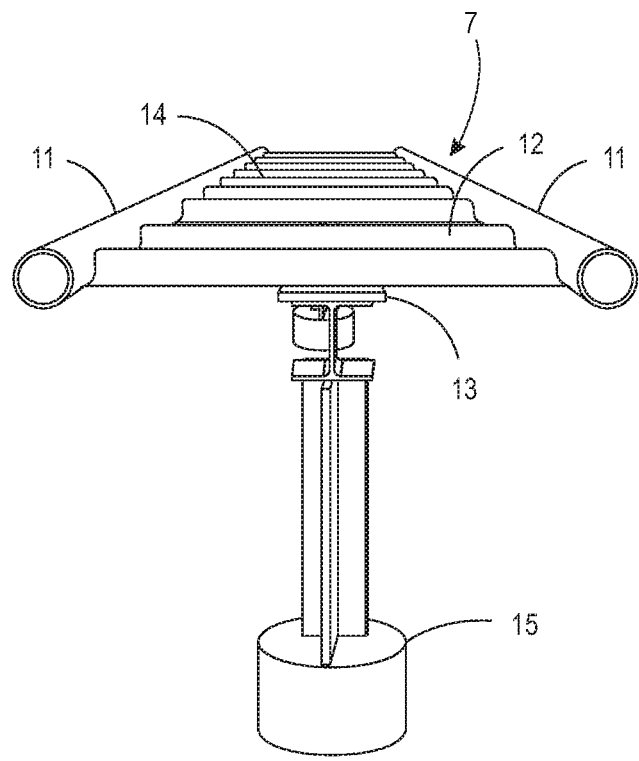
FIG. 6 illustrates an embodiment of a track or rail of the novel transportation system.
Figure 7:
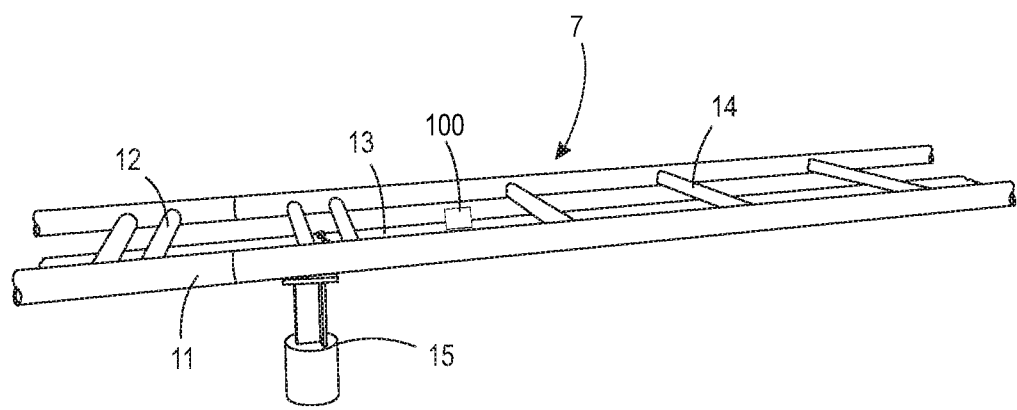
FIG. 7 illustrates another view of an embodiment of a section of track or rail mounted off of the ground on a test track.
Figure 15:
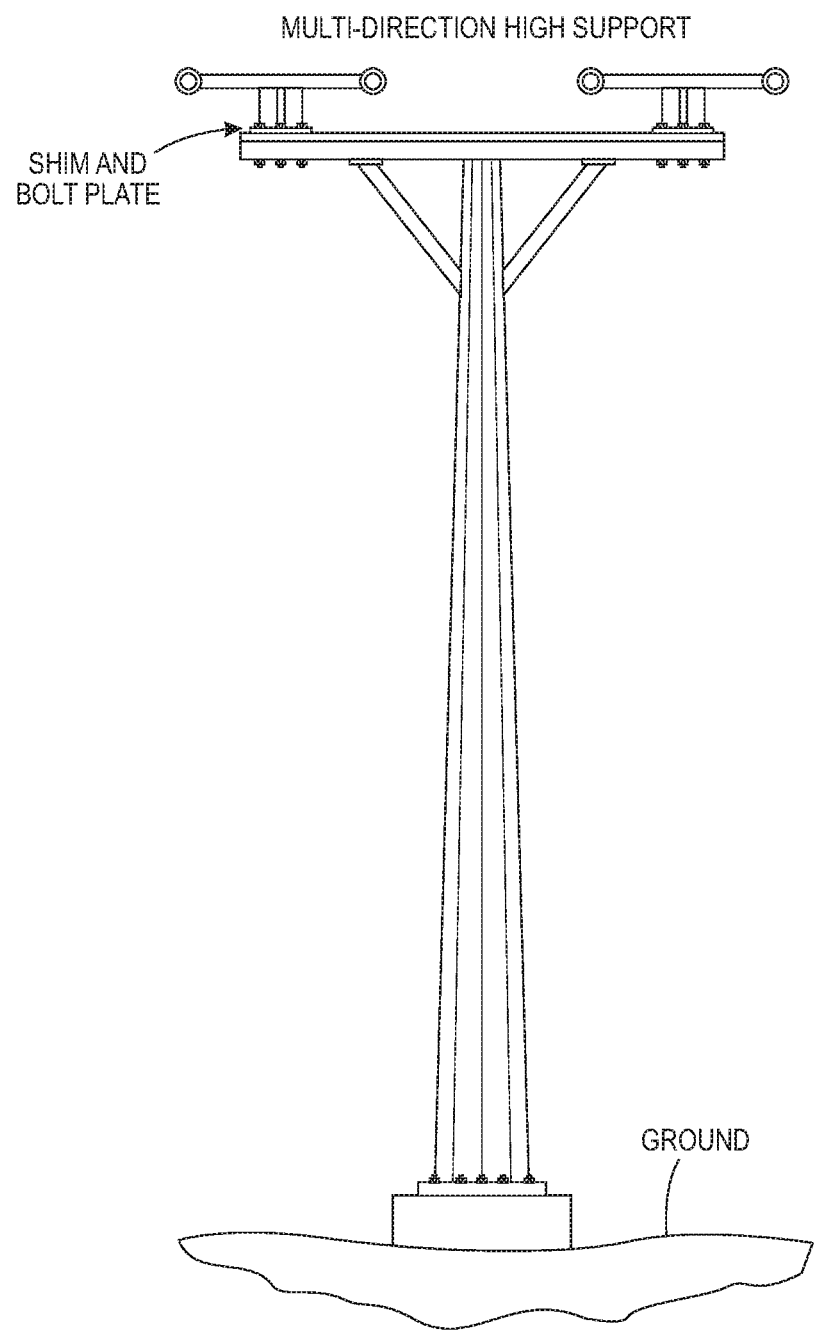
FIG. 15 illustrates a side view of an embodiment of a high support for placing two one way tracks on a single post.

FIG. 6 illustrates a track or rail 7 in one embodiment of the novel transportation system. FIG. 7 is another view of a section of track 7 mounted approximately 3 feet off of the ground. In other embodiments, the track 7 may be located at an elevation generally 12-15 feet off of the ground to facilitate clearance for vehicles to pass beneath the track 7, and to take up very little ground space. However, the track 7 can be elevated to any height desired. Minimum height of the track 7 will be enough to clear grasses and/or snow where applicable. As illustrated in FIGS. 6 and 7, in an embodiment, the track 7 may be constructed with lightweight tubular steel. As illustrated in FIG. 15, in an embodiment, a high support member may be utilized which is capable of supporting two one-way track sections on a single post 15. The track 7 is mounted atop posts 15. The posts 15 may comprise screw piles, steel posts secured in concrete, or other posts that may be appropriate for the conditions where they are mounted. The posts 15 may be small in diameter, such as 6 inch tubular, and low cost. The forces on the posts 15 due to the use of light weight vehicles 19 are not very large—they represent a small vertical force and an even smaller horizontal force. For example, including a factor of safety, the posts 15 may need only to support a 10,000 pound vertical force and a 1,000 pound horizontal force. The track 7 may be welded or bolted directly to the posts 15 at reinforcing cross members 12 on the track 7. Long spans of track 7 may include an underside support member 13 to reinforce the main track members 11 and allow greater distances between supporting posts 15.

Figure 8:
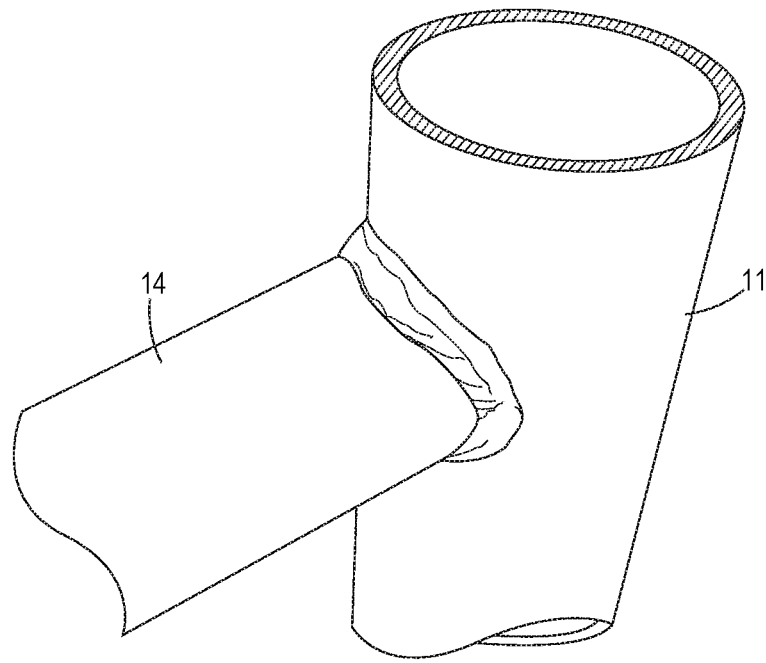
FIG. 8 illustrates an embodiment of a track section.

FIG. 8 illustrates an exemplary section of track 7. Such track sections may be robotically welded in the shop and then delivered to the construction site. The illustrated weld joins cross members 14 of tubular steel. The track 7 can then be coated depending on weather conditions and desired color prior to installation.

In the novel transportation system, turns are banked and designed for vehicles 19 to traverse the turns while maintaining a consistent speed. This allows both a smooth rider experience and puts less force on the vehicle 19 and track 7 (allowing them to be lighter weight and less costly). Banking, the pairing of vehicle speed in the turn, and the degree of the angle will be very close to theoretical optimums to put all of the forces on the front top wheels 1 and the top rear wheels 6. This will be especially true for the higher speed loops 44.

Figure 9:
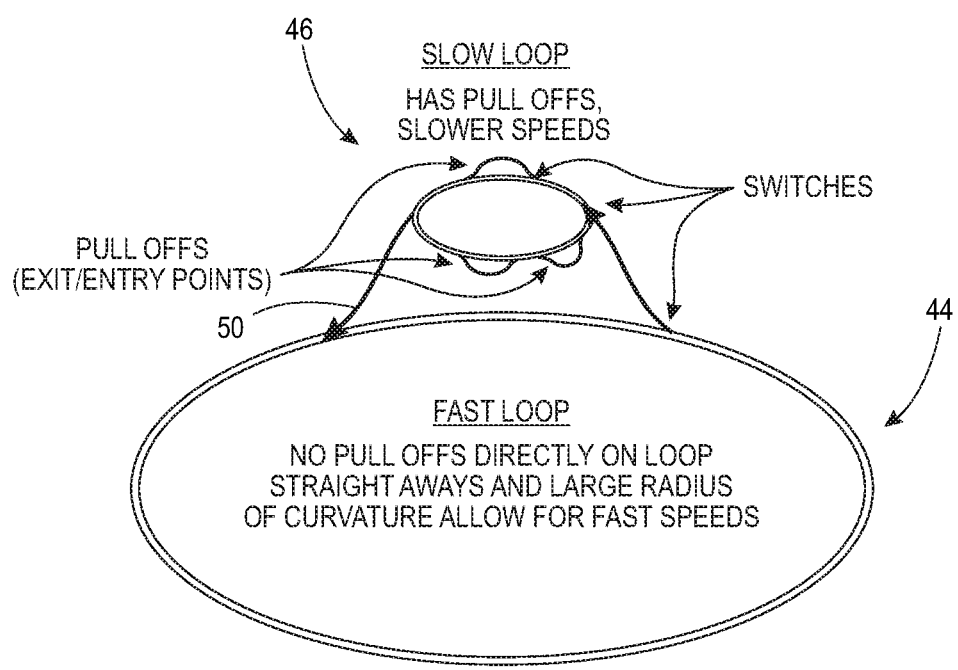
FIG. 9 illustrates an embodiment of how passengers may enter and exit vehicles in slow speed loops or pull offs.
Figure 13:
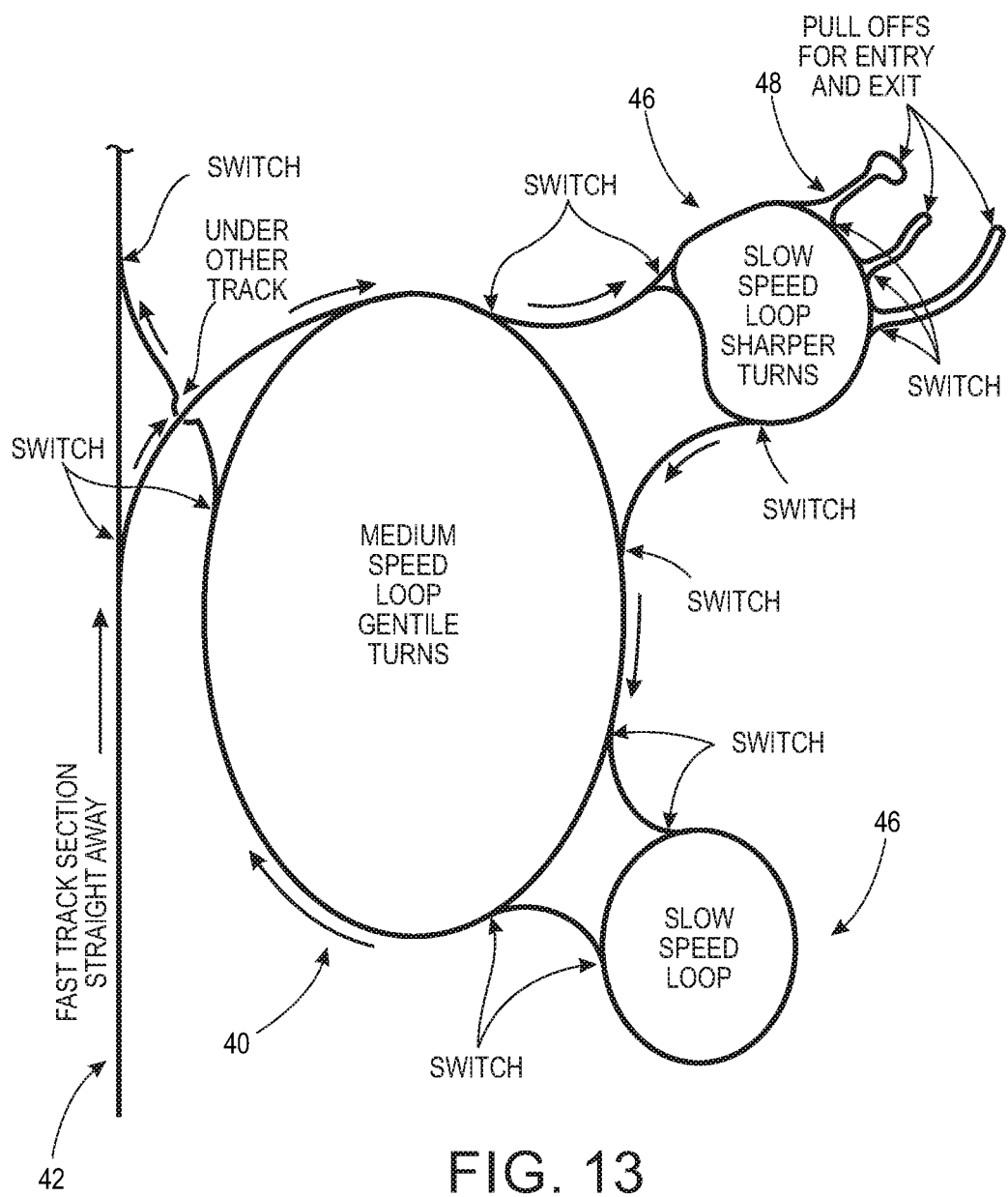
FIG. 13 illustrates an embodiment of slow speed loops or pull offs.

Vehicles 19 move forward and follow the track 7 requiring no active steering. Knowing the destination of each vehicle 19, the track 7 is switched by the system computers to take each vehicle 19 to its destination. As illustrated in FIGS. 9 and 13, in an embodiment, the track 7 layout is designed to include normal/medium speed loops 40, high speed track 42, fast loops 44, and slower speed loops 46. The system allows for several layers of these loops 40, 42, 44, 46 depending on desired service and track geometry. Passengers will enter and exit vehicles 19 on areas that are slow speed loops 46 or pull offs 48. Vehicles 19 may accelerate first on a slower loop 46 or entry ramp 50 and be switched in to join existing traffic patterns so as not to slow the flow of traffic.

Figure 10:
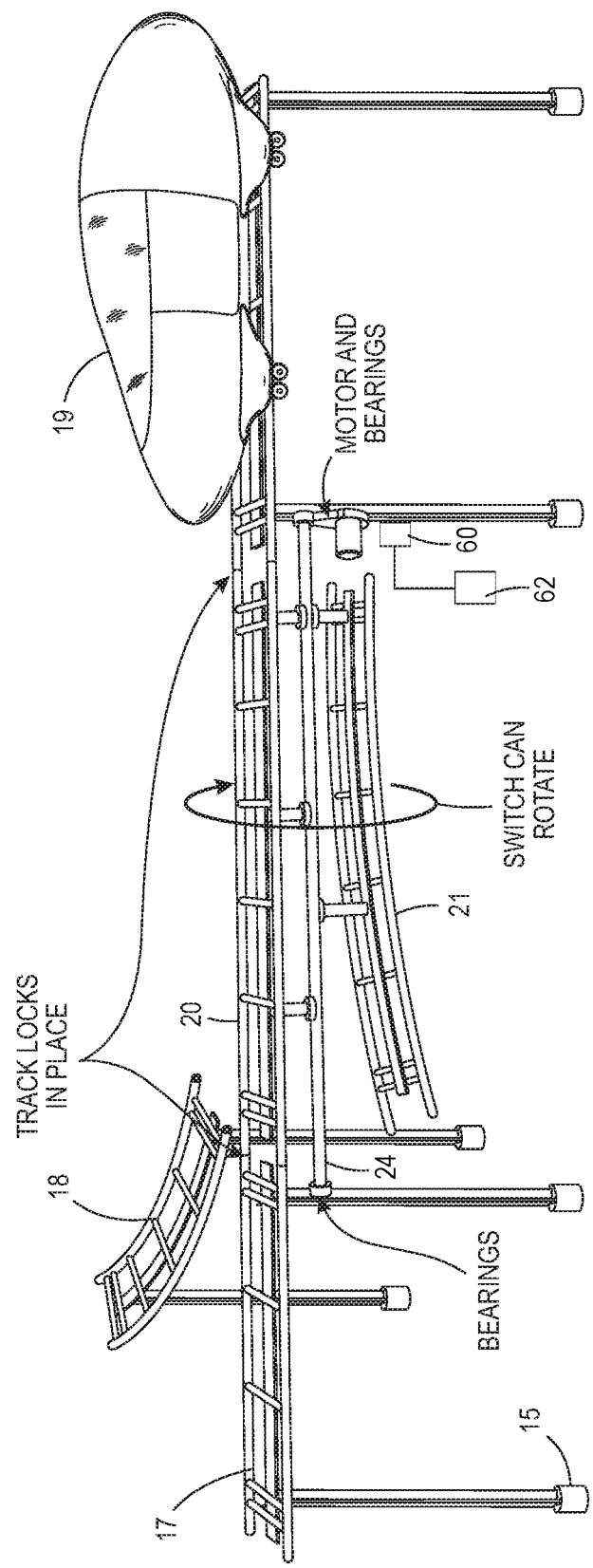
FIG. 10 illustrates an embodiment of a switching system employed in the transportation system.

As illustrated in FIG. 10, in an embodiment, the novel transportation system may employ a flip switching system 20, 21. The switching system 20, 21 is evenly balanced in that it has about the same weight on the straight track piece 20 and the curved track piece 21 and is also relatively light weight. This allows the switching system 20, 21 to be activated without a large amount of energy. The switching system 20, 21 is rotatable and locks to either the straight track section 17 or the curved section of track 18 in this embodiment. The flip switching system 20, 21 includes a straight travel state, a curved travel state, and a transition state wherein the switching system is rotating either the straight track section 17 or the curved section of track 18 into engagement.

Figure 11:
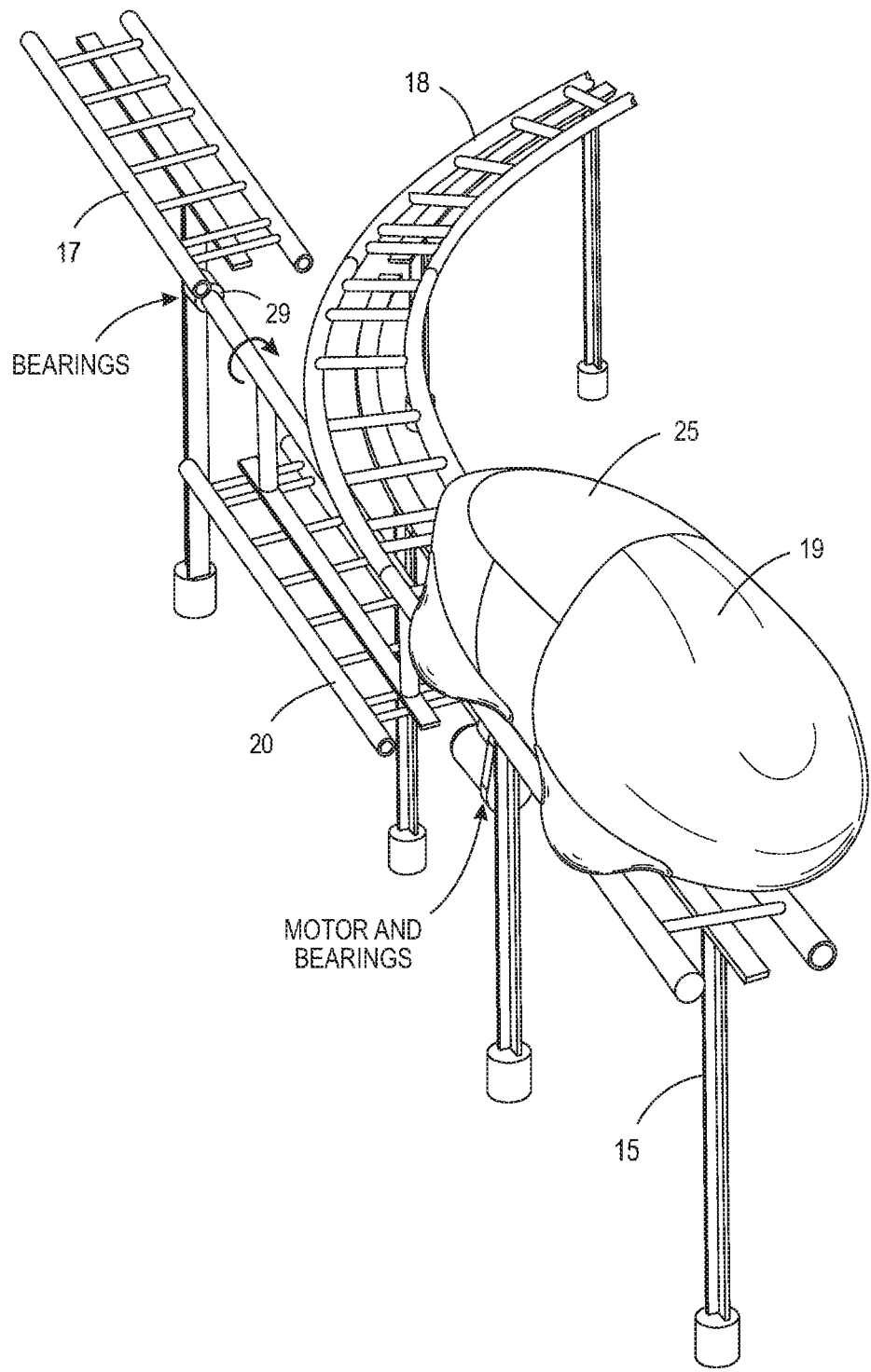
FIG. 11 illustrates an embodiment of the switching works in the transportation system.

FIG. 11 further illustrates an embodiment of the switching system 20, 21 wherein the vehicle 19 is traveling to a curved section of track 18. In an embodiment, motor drives 29 may be utilized to switch between straight track section 17 and curved track section 18. The motor drives 29 may be, but are not limited to, brushless direct current (BLDC) motors, such as stepper or servo motors that allow for exact positioning.

As illustrated in FIG. 11, the switching system 20, 21 and the overall computer system controls the navigation of the vehicle 19 such that the vehicle 19 only needs speed control and emergency braking. The switching system 20, 21 is either engaged to turn the vehicle or to direct the vehicle 19 to go straight. Both the vehicle 19 and the switch controls are simple, however when combined they allow for a driverless vehicle 19 that can go anywhere there are tracks 7. The switching system 20, 21 includes a piece of straight track 20 and piece of curved track 21 that are disposed opposite one another, balanced in weight, and rotate around a drive member 24.

In an embodiment, the drive member 24 includes a drive shaft coupled with the straight track 20 and the curved track 21. The drive shaft is rotatably seated in bearings mounted to posts 15. One or more motor drives 29 transfer torque to the drive shaft of the member 24 to rotate the member 24 and engage either the straight track 20 or the curved track 21 with the track 7. In an embodiment, the motor drives 29 unidirectionally rotate the drive shaft.

Figure 14A:
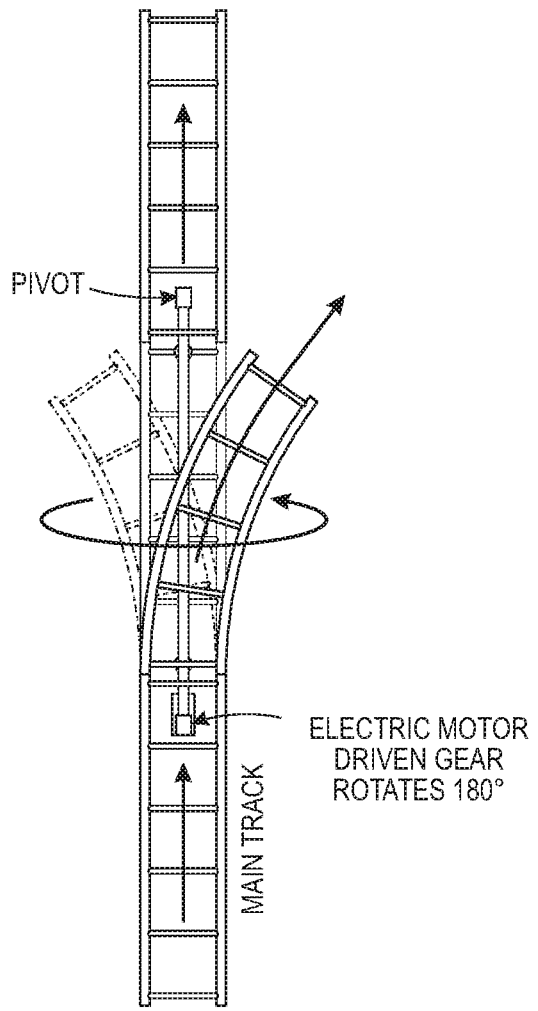
FIG. 14A illustrates an embodiment of a switching system with a flip switch.
Figure 14B:
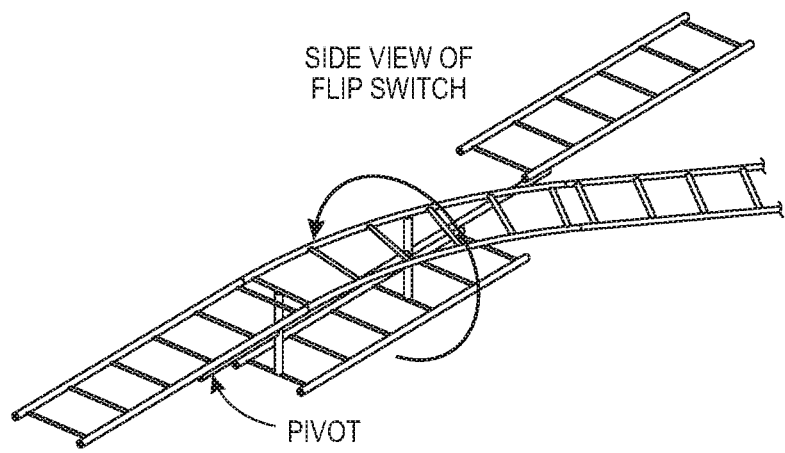
FIG. 14B illustrates another embodiment of a switching system with a flip switch.

In other words, when activated, the motor drives 29 "flip" the switch 20, 21 from straight to curved, or vice versa, (rotating along an axis as indicated by the arrow in FIG. 11) and the track 7 locks in with the straight track 20 or the curved track 21, respectively. In one embodiment, the track 7 may lock with the switch 20, 21 magnetically, such as with the use of solenoids. This switch 20, 21 is balanced, light weight, low cost and energy efficient. The motor drives 29 may be powered with a direct electrical connection or via a battery allowing for remote operation. Switching may be initiated by the control system described herein. FIGS. 14A (top view) and 14B (perspective view) illustrate further embodiments of the switching system 20, 21 and motor drives 29. Sensors may be employed to ensure the switch has flipped such as monitoring motor position and may include an electric circuit test for connection.

Figure 16:
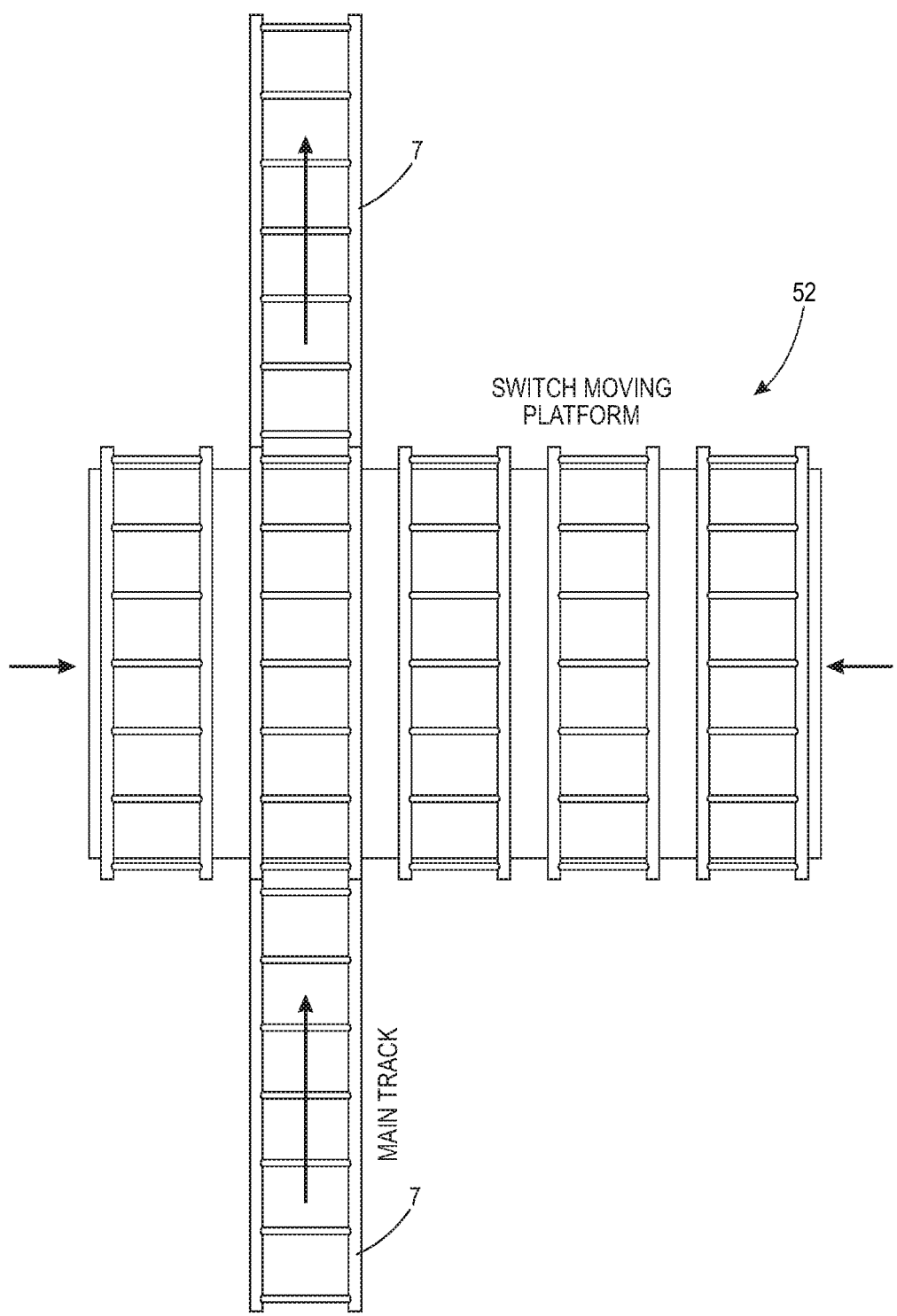
FIG. 16 illustrates an embodiment of a moving platform switch for high volume departures such as at a mass transit connection.
Figure 17:
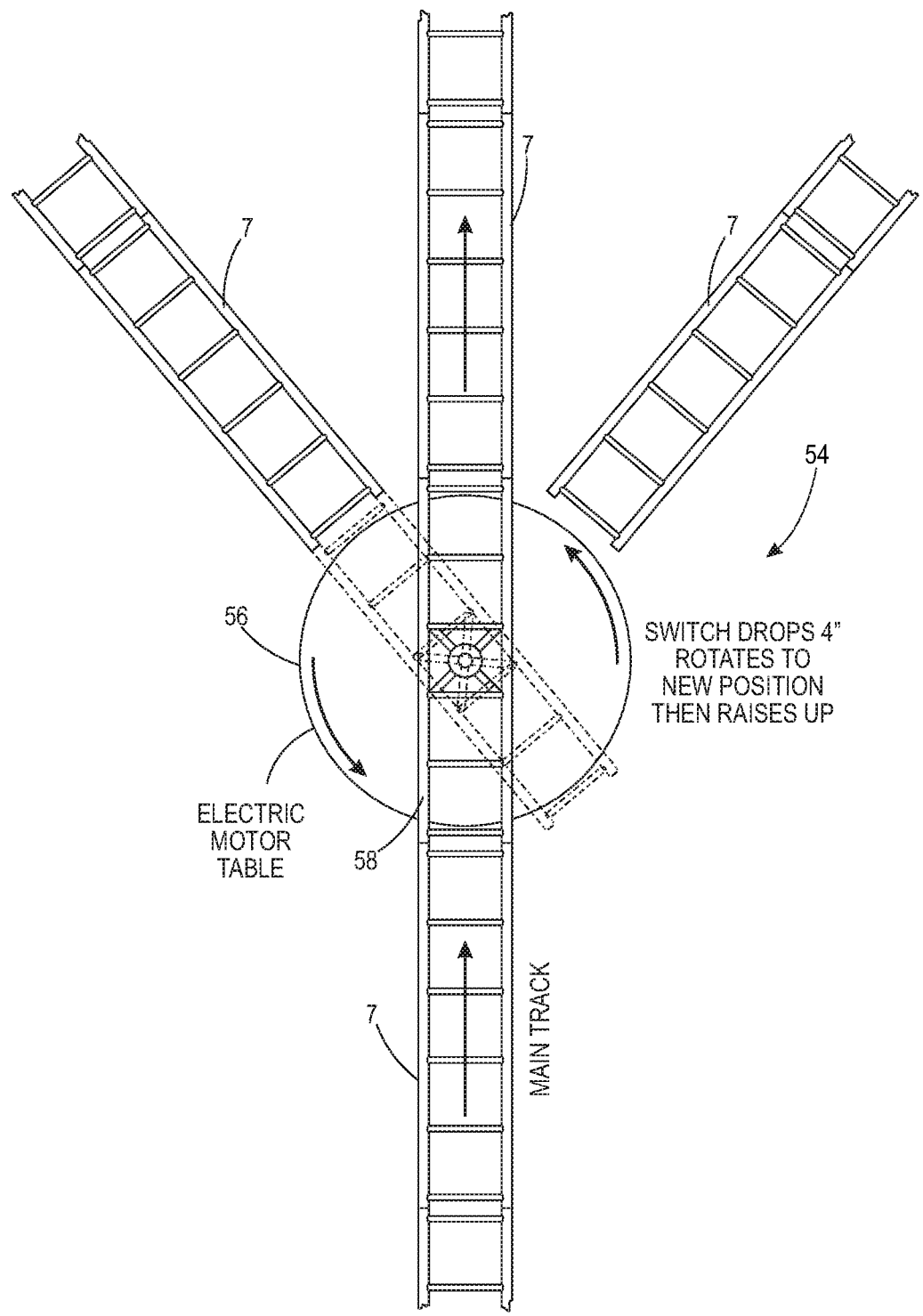
FIG. 17 illustrates an embodiment of a turntable switch for removing vehicles from the transportation system for maintenance.

FIG. 16 illustrates an embodiment of a moving platform switch 52 with, in this example, five interchangeable straight track sections which may be moved laterally to add vehicles 19 to the transportation system for high volume departures such as at a mass transit connection. FIG. 17 illustrates a turntable switch 54, having an electric motor table 56 to rotate the central track sections 58. The turntable switch 54 may be used to pull vehicles 19 off track 7 for maintenance, for example.

Ownership of sections of track can be public, private, or shared. With this design, billing can be arranged by a number of factors including, but not limited to, time of travel, length of travel, priority and vehicle type used.

In an embodiment, switching systems 21/22, 52, and 54 are controlled by an associated computer system. Desired vehicle 19 loading (to control traffic flow and avoid congestion, for example) will be input and stored in the main and/or zonal computers. The driver or controller for each vehicle traveling on the transportation system will select a desired entry time and a destination point. Based on track geometry and the desired entry and exit points, the main and/or zonal computers will send the route to the vehicles and switches 21/22, 52, and 54. Once a passenger has boarded a vehicle 19—and in some embodiments, after the passenger engages the lock and any safety devices—and indicates to the vehicle 19 that the passenger is ready to depart, the system (the vehicle 19, the switches 21/22, 52, and 54, and the main and zonal computers), will control the speed, route, stopping and starting of the vehicle 19 until it reaches the desired destination. In an embodiment, the main computer will run a predictive congestion routine to identify any expected congestion in the short term (0-10 minutes) based on the planned starting points and destinations of vehicle 19 trips as well as any vehicles 19 without riders traveling to destinations. In the event of predicted congestion, the main computer will calculate alternative routes and/or stagger vehicles 19 from a particular merge location, to keep congestion from occurring. Longer term histories of vehicle 19 densities will be used to coordinate priority routing as well as planning of anticipated special events.

The predominant controls for the system are speed for the vehicle 19, direction for the switch 21/22, 52, and 54, and vehicle traffic regulation by the main and monitoring computers.

The main computer controls rider interaction, vehicle 19 allocation and, in certain embodiments, billing. With respect to the vehicle 19, the speed control is typically going to be forward only in transit (there may be a slower reverse speed employed for parking and other special uses). The vehicles 19 may also be equipped with an emergency braking system triggered by the control system.

Switches 21/22, 52, and 54 control the path a vehicle 19 takes to reach its destination. High speed switches 21/22, 52, and 54 will exist on the higher speed loops 44. Passengers and vehicles 19 will typically have a choice of one of two directions. Parking garage style switches will employ a conveyer belt type switching mechanism.

In very high-density areas these parking garages may also have a vertical component to store more vehicles 19. There will be slow switches and manual switches that can be employed at end points where passengers exit and enter vehicles 19.

Track 7 design and vehicle 19 specifications are provided to achieve the desired results. The track 7 design, specifically geometry and switching systems 21/22, 52, and 54 are designed to determine safe and comfortable speeds that vehicles 19 will travel at for a particular section of track 7 and spacing between vehicles 19 during switching. In many embodiments, all vehicles 19 on the system will travel at the same speeds on the same section of tracks 7. In concert with the design of the track 7, the vehicle 19 specifications for acceleration, maximum weight, and aerodynamic profile and top speeds are known. This combination of track 7 and vehicle 19 standards allows the system computers to control the flow of traffic on the system effectively and efficiently.

Maintenance and performance records are tracked by the main computer system for all vehicles 19.

The main computer will also record the battery charge levels when the vehicle 19 is idle (waiting for its next rider) and determine if charging is needed. In cases where the vehicle battery needs charging, the main computer will route the vehicle 19 to an appropriate charging station. Vehicle 19 maintenance will be both scheduled and diagnosed from vehicle 19 performance. For example, scheduled maintenance may include checking, rotating, or replacing wheels at certain mileage. This scheduled maintenance will include motor, battery, brakes and other components of the vehicles 19.

Using vehicle 19 run data, SWIFT Rails will diagnose vehicle 19 performance problems and be able to detect small problems ahead of larger maintenance issues. Each vehicle 19 is sent a set of instructions for sections of track 7. For example, on track 7 section 4569 the vehicle 19 is instructed to accelerate from 50 mph to 70 mph. Based on standardized acceleration minimums the vehicle 19 should always make this transition in the same amount of time. Additionally, the vehicle 19 energy use should be the same within a narrow tolerance. The system will compare vehicle 19 performance against expected results and flag vehicles 19 for service inspection ahead of scheduled maintenance Each vehicle 19 will have a performance curve at commissioning and be monitored throughout its life of operations.

Several rules govern the operation of the transportation system which are used to simplify the operations and ensure consistency of traffic flow and redundancy. The rules governing operation of the transportation system may include (i) all vehicles 19 on the system are controlled by the system; (ii) all vehicles have a unique identification (ID); (iii) all vehicles 19 have onboard systems that at a minimum have vehicle 19 position and speed and communications with the zonal computers and other vehicles 19, typically, they will also have onboard diagnostics to confirm that vehicle 19 systems are all functioning properly; (iv) all track 7 sections have specific speeds of travel that vehicles 19 will travel on that section of track 7—for example a specific section may have a speed of 80 mph; (v) all track 7 sections will also have a tolerance for speed variance on that section, for example 4%; (vi) there are system brakes on the system that will allow the slowing or stopping of vehicles 19 by the system. All rules are not necessarily present in all embodiments.

If a vehicle 19 is traveling outside of the speed tolerance for the track 7, two steps will occur. The first step will be a check to the vehicle 19 to see that operations of the vehicle 19 are acceptable. If there is a quick deceleration, the vehicle 19 ahead and other vehicles 19 on the track 7 section will be notified and slowed down.

The system will be redundant in that the onboard vehicle 19 will be reporting speed on the track 7 section as well as the track 7 system. If one computer system goes down, the other systems can operate until the system is repaired and back up. The main computer system creates the schedule of turns and segment speeds which is also transmitted to the vehicles 19, the zonal computers, and the switch computers 62. The zonal computer would typically monitor and send the upcoming vehicle 19 IDs and if they are to be switched or not switched. In the event the zonal computer malfunctions, the vehicle 19 computers have the same information and can send this to the switch 21/22, 52, 54. In addition to the onboard vehicle 19 computer which has the vehicle's route (segment speeds and switching status), computers on the track 7 (e.g. the track sensor 100 described below) will be tracking vehicle 19 speed and issue immediate slow down directions to other vehicles 19 if the vehicle 19 is not within the desired tolerance. In one example, if the onboard vehicle 19 communication is lost and not reporting speed and begins to slow quickly, the track 7 compares the speed of the vehicle 19 to the desired speed of the track 7 section and compute that it is out of tolerance. Depending on the degree of deceleration, the system will wait a specified time for vehicle 19 to reply or can conclude that the vehicle 19 poses a threat to other vehicles 19 and send immediate slow down directions to other vehicles 19 on the track 7 section. For example, if the vehicle 19 slows down 10 mph in an unplanned fashion, the track 7 computer immediately sends a warning and slow down signal to other vehicles 19 on the track 7 section. If for example, the vehicle 19 had a problem, it would be brought to a stop and the other vehicles 19 in the track 7 section would be stopped. As illustrated and described in FIG. 12, in an embodiment, the zonal computer is notified and no more vehicles 19 are put on this particular track 7 section until the administrator gives an all clear sign that the track 7 section is ready for operation.

There are small differences between measurements of velocity and position and the actual values. SWIFT Rails computers calculate a tolerance on each section of track 7 on a velocity basis or a percentage of velocity and then monitor the vehicles 19 to determine whether the vehicles are traveling within the desired velocity tolerance. If, for example, the design speed for a certain section of track 7 is 80 mph and there is a 5% tolerance, the system calculates any speeds below 76 mph or over 84 mph as out of tolerance and moves to the next step for corrective action. In the case of a merge where the switch computer 62 has directed merging vehicles 19 to slow down or speed up this tolerance is deemed acceptable. A rapidly decelerating or accelerating vehicle 19 beyond tolerance indicates a problem that must be quickly addressed. The rate of change of the velocity determines the system response, including stopping all vehicles and redirecting any new traffic away from the track 7 segment involved. In some embodiments of the design, there will be a system brake that can be activated to slow all vehicles 19 on a track 7 segment. The brake is a component of the track 7 system and may be magnetic, an air brake, or friction brake. In cases when a quick deceleration of vehicles 19 is desired, the track 7 system engages with a metal strip on the vehicle 19 to quickly brake but not stop vehicles 19. In cases of a vehicle 19 that may have control problems, all vehicles 19 can be slowed by the system or the engagement of brakes on the individual brake systems of vehicles 19.

One difference, among others, between the novel system described herein and known systems such as autonomous automobiles is the computation reaction time, and redundancy. In the case of SWIFT Rails, it is detectable that a vehicle 19 ahead is decelerating before it would be otherwise apparent by a single vehicle. Even without a visual line of sight the deceleration, or other potential issue, can be identified much sooner.

Because the vehicles 19 travel in one direction and are elevated such that they are not interacting with other means of transportation, there are only two potential collisions that have to be monitored on a section of track 7—the vehicle 19 ahead and the vehicle 19 behind. If the vehicle 19 ahead slows in speed, to avoid collision, the current vehicle 19 needs to be slowed in speed. Because the number of potential accident points is so small—i.e., the speed of the vehicle 19 ahead vs. the current vehicle—redundancy can be built. This redundancy may be accomplished by acquiring vehicle 19 speed inputs from both the track 7 and the onboard computer of the vehicle 19 ahead.

Comparing the SWIFT Rails system to a conventional driverless car, the driverless SWIFT Rails vehicle 19 is computationally simple. The driverless car will have to compute millions of possible scenarios with line of sight sensing to look for objects such as other vehicles, bicyclists, pedestrians, and anything else that may intersect at grade crossings.

Methods of capturing position and velocity may be redundant and may be communicated from different points in the system—the vehicle 19 onboard computer and track 7 computer. The track 7 position is known based on track 7 layout and is static information for the track 7 computers. Track sensors 100 may be mounted on the side or bottom of the track 7, or on the support member 13 in a plane beneath the cross members 14. The track sensors 100 will record vehicle 19 ID and velocity via a non-contact method such as, but not limited to, Doppler radar or RFID. In certain embodiments, video is also captured, and the track 7 computer may be side mounted on the track 7. The attachment to the track 7 or the post 15 is from underneath so as not to interfere with the vehicles 19.

The vehicle 19 onboard computers will typically calculate position and velocity via alternative means adding to the redundancy and accuracy of the measurement—obtaining speed and position from multiple sources by multiple methods. The vehicle 19 onboard computer will use a non-contact method sensor 106 for determining velocity such as by measurement of a fixed wheel speed radius or utilize GPS measurement to determine velocity and capture position. In an embodiment, the vehicle sensor 106 may comprise one or more Hall-effect sensors for measuring the speed of a rotating component of the vehicle 19 to determine the speed of the vehicle 19.

In one preferred embodiment, in very high passenger density applications where there are a large number of track 7 under and over exchanges, vehicle 19 onboard computer determination of velocity and position is prioritized over GPS calculations which will need to be associated with track 7 topology.

With the layout and design rules for the operation of SWIFT Rails, there are only two potential forms of collisions between vehicles. They cannot go off the track, as they are locked in. They cannot hit head on, as they are on one-way tracks. The potential possibility that a vehicle would run into one another from behind is automatically controlled for and handled in a redundant manner. The only other possible form of collision is in a merge situation which is also automatically controlled and redundant.

The switching system 20/21 (as illustrated in FIGS. 10, 13, 14A and 14B) allow vehicles 19 to merge onto and off of different sections of track 7 at speed. The timing of the switching system 20/21 is handled similarly to the manner of monitoring the vehicle 19 in front—by comparing headspace or the relative speeds and distances of vehicles 19 on a continuous track 7. Based on the track 7 speeds and time of switching, the control system calculates when the current vehicle 19 will reach the switch 20/21 and pass through the switch 20/21. The expected time that the vehicle 19 will merge with a section of track 7 is calculated by the system based on distance and speed. With an appropriate factor of safety, and to allow for time for the switch 20/21 to flip, vehicle 19 speeds are modulated to achieve efficient merging. The current vehicle 19 can be slowed or the merging vehicle 19 can be slowed to facilitate the merging. The decision is made by the routing switch computer 62 and sent to both vehicles 19. In high density applications, the system will look at routing density on particular track 7 lines.

In another preferred embodiment, the system may also utilize batch routing, that is grouping a number of vehicles 19 together that are taking the same direction on a switch 20/21 to allow for faster entry onto a certain track 7 section. For example, this might include merging ten vehicles 19 from one track 7 section and then merging ten vehicles 19 onto another track 7 section. Batch routing is faster than alternately merging one vehicle 19 at a time such that the system requires flipping the switch 20/21 between each vehicle 19. These vehicles 19 may be joined together to travel as a group, allowing for greater density of vehicles on the system and to accommodate a wide variety of needs such as a handicap vehicle plus a group of four plus a luggage car.

The switch 20/21 also includes redundant safety mechanisms. It includes sensors to confirm that the sections of track 7 have connected with the straight switch section 20 or curved switch section 21. A digital image of the track 7 at the connection point is also taken and compared to an image of the track 7 switched. In an embodiment, the digital image may be captured by a digital image sensor 60 such as a digital camera or video recorder and transmitted wirelessly or by electrical connection to the switch computer 62. In an embodiment, the switch computer 62 may include a processor operating under the control of a set of programming instructions, which may also be referred to as software. The switch computer 62 may also include a memory (not depicted) in which programming instructions are stored. By requiring both the sensors and the digital image comparison for an affirmation that the track 7 is indeed properly switched inserts redundancy into the switching system 20/21.

In the manner described above, the system controls are able to automatically control the vehicles 19 and utilize redundant sensor checks to create greater passenger safety.

In certain embodiments, video cameras will be located on numerous sections of the system and human operators will be viewing them. Human operators can put digital input into the system, modify track 7 section speeds if needed, and make decisions in unforeseen cases.

In an embodiment, in order to facilitate efficient merging, SWIFT Rails physical track 7 layout has vehicles 19 move progressively to faster track 7 sections; similarly progressing vehicles 19 to slower track 7 sections to reach final destinations, as illustrated in FIG. 13. The faster track 7 sections will be straight or have gentle curves with a radius of curvature typically above 1,000 feet. Progressively slower track 7 sections may have turns with a small radius of curvature. SWIFT Rails vehicles 19 can maneuver sharp turns with a radius of curvature under 100 feet; however, in these cases the speed will be comparatively much slower for passenger comfort and to reduce forces on the vehicle 19 and track assemblies. In an embodiment, the track 7 will typically be banked within 20% of ideal to reduce the force on the track 7 and the passenger.

As illustrated in FIG. 13, in an embodiment, there are a series of track 7 sections progressing from the fastest speed (straight away), to medium speed (gentle turns), to slow speed (sharper turns), to destination points. These series of one way switched track 7 sections allow a progression of acceleration or deceleration and pull offs that serve as the entry and exit points to the system. This allows for a wide variety of access solutions based on transportation geography. In the novel system, traffic will be one-way on most sections of track 7. However, in some embodiments there may be some special use or low-density traffic two-way track 7 sections traversed at slower speeds.

Figure 12:
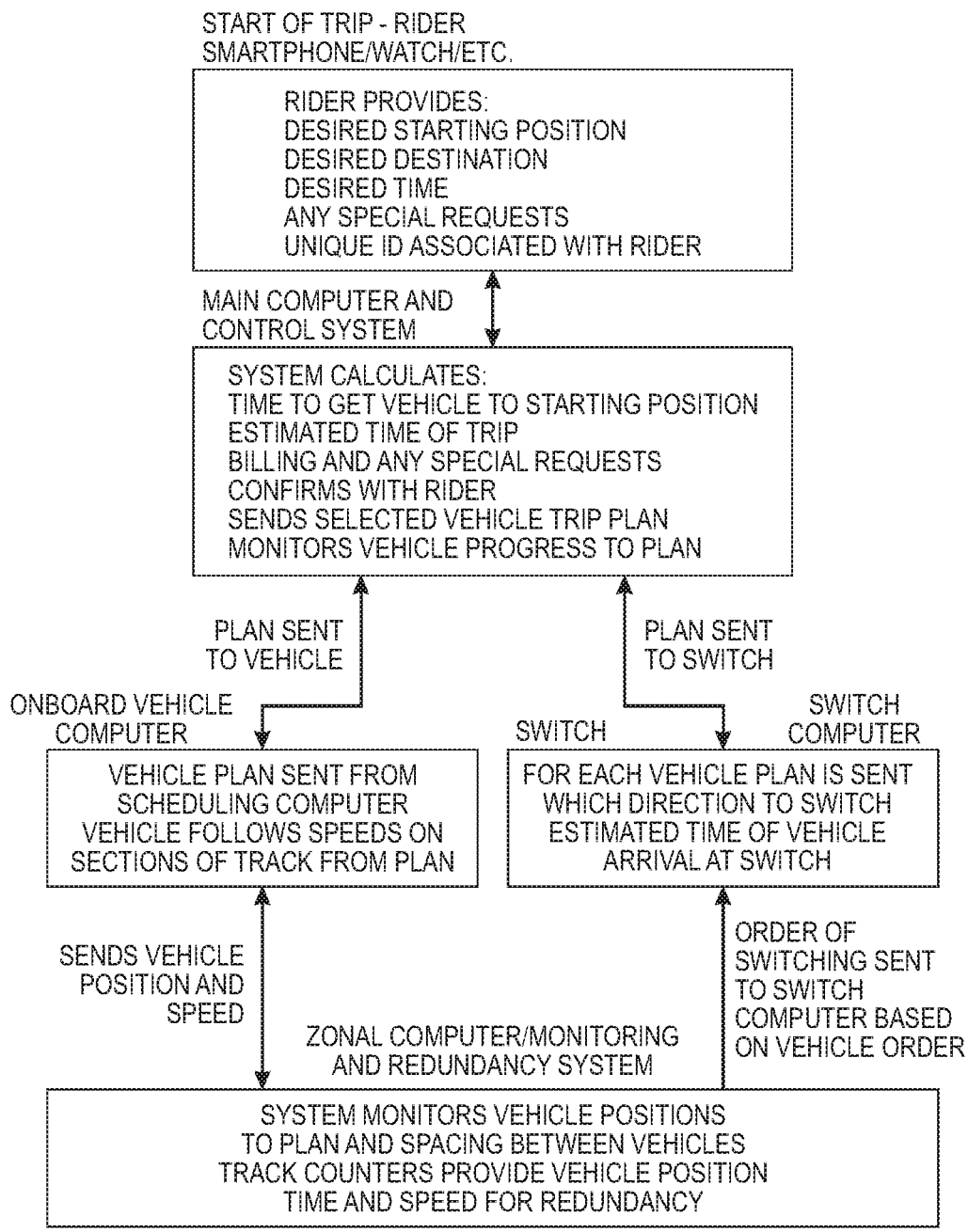
FIG. 12 illustrates a flow chart depicting an embodiment of various aspects of the control system.

FIG. 12 illustrates a flow chart depicting various aspects of the control system. The vehicle 19 is programmed with a desired travel or movement plan that includes speeds to traverse the different sections of track 7. This program may be determined based on track 7 geometry, destination, starting point, and/or requested time of arrival. For example, there may be various speeds for banked turns (such as 70 mph or 30 mph) based on the radius of curvature, while long straightaways may allow for 100 mph speeds. The monitoring computer will track and compare the vehicles 19 against their travel plans.

In addition to signals from the vehicles 19, track 7 counters monitor the vehicle ID, time, and speed. These track 7 counter signals will be sent to the monitoring computer system. The monitoring system will make corrections to the programmed travel plan if there are deviations from the travel plan. Additionally, the monitoring system can issue emergency stop orders to vehicles 19 if there is a failure on the system.

One or more features of the embodiments described supra may be combined to create additional embodiments which are not depicted. Therefore, while the presently-preferred form of the transportation system has been shown and described, and several modifications discussed, persons skilled in this art will readily appreciate that various additional changes may be made without departing from the scope of the invention disclosed herein. The embodiments described above are therefore to be considered in all respects as illustrative, not restrictive. The scope of the invention is indicated by the appended claims, and all changes that come within the meaning and range of equivalents thereof are intended to be embraced therein.

What is claimed is:

1. A transportation system, comprising:
    an elevated track comprising:
        a plurality of posts,
        at least two track members disposed in parallel,
        a plurality of cross members transversely disposed and coupled between said at least two track members,
        a plurality of reinforcing cross members transversely disposed and coupled between said at least two track members operative to support said at least two track members on said plurality of posts, and
        a support member disposed between said plurality of posts and said plurality of reinforcing cross members, wherein said support member comprises a beam disposed parallel with said at least two track members;
    a driverless vehicle operatively coupled with to said at least two track members and operable to traverse said elevated track;
    a first elevated track loop wherein said driverless vehicle is operable at a first speed;
    a second elevated track loop operable to receive said driverless vehicle merging from said first elevated track loop, wherein said driverless vehicle is operable at a second speed; and
    an elevated track section operable to receive said driverless vehicle merging from said second elevated track loop, wherein said driverless vehicle is operable at a third speed;
    a plurality of switching systems, wherein at least one of said switching systems is located between said first elevated track loop and said second elevated track loop, and wherein at least one of said switching systems is located between said second elevated track loop and said elevated track section;
    wherein one or more of said plurality of switching systems comprises:
        a flip switching system operable to transfer said driverless vehicle from a straight section of track to a curved section of track, wherein said flip switching system comprises: a drive shaft rotatably coupled with two or more of said plurality of posts; a straight track portion fixedly coupled with said drive shaft a curved track portion fixedly coupled with said drive shaft opposite said straight track portion; and
        a motor drive operable to unidirectionally rotate said drive shaft whereby one of said straight track portion and said curved track portion are selectively rotated about a longitudinal axis of said drive shaft and aligned with said straight section of track.

2. The transportation system according to claim 1, further comprising:
    a digital image sensor operable to capture a state of said flip switching system, wherein said flip switching system comprises a straight travel state, a curved travel state, and a transition state; and
    a switch computer operable to receive a signal from said digital image sensor.

3. A method of operating a transportation system, comprising:
    providing a first driverless vehicle operatively coupled with to an elevated track having two track members disposed in parallel and operable to traverse an said elevated track, wherein said first vehicle includes an on-board contactless speed sensor and said elevated track includes a plurality of contactless speed sensors;
    providing a second driverless vehicle operatively coupled with to said parallel track members and operable to traverse said elevated track, wherein said second driverless vehicle includes an on-board contactless speed sensor;
    providing a first elevated track loop wherein said first and second driverless vehicles are operable at a first speed;
    providing a second elevated track loop operable to receive said first and second driverless vehicles merging from said first elevated track loop, wherein said first and second driverless vehicles are operable at a second speed;
    providing an elevated track section operable to receive said first and second driverless vehicles merging from said second elevated track loop, wherein said first and second driverless vehicles are operable at a third speed;
    comparing a speed signal from said first driverless vehicle contactless on-board speed sensor with a speed signal from one or more of said track plurality of contactless speed sensors;
    comparing a speed signal from said second driverless vehicle contactless on-board speed sensor with a speed signal from one or more of said track plurality of contactless speed sensors; and
    reducing a speed of said second driverless vehicle where said first driverless vehicle speed has decelerated beneath a predetermined speed to maintain a predetermined distance between said first and second driverless vehicles.

4. The method of operating the a transportation system according to claim 3, further comprising:
providing a second section of said elevated track operable to receive said first and second driverless vehicles merging from a first section of said elevated track; and
merging said second driverless vehicle onto said second section of said elevated track where said first driverless vehicle speed has decelerated beneath a predetermined speed to maintain said speed of said second driverless vehicle.

5. The method of operating the a transportation system according to claim 3, wherein said:
elevated track contactless speed sensors comprise a radio frequency identification reader operable to identify radio frequency identification tags located on-board said first and second driverless vehicles.

6. The method of operating the a transportation system according to claim 3, wherein said:
elevated track contactless speed sensors comprise a Doppler radar transmitter operable to determine a velocity of said first and second driverless vehicles.

7. The method of operating the a transportation system according to claim 3, further comprising:
providing a plurality of driverless vehicles operable to traverse said elevated track;
providing a global positioning system receiver coupled with said first and second vehicles and said plurality of driverless vehicles operable to determine a velocity and a position of said plurality of driverless vehicles;
providing an on-board computer mounted in each of said first and second driverless vehicles and said plurality of driverless vehicles operable to determine a velocity of said first and second driverless vehicles and said plurality of driverless vehicles utilizing said on-board contactless speed sensor and said global positioning system receiver; and
prioritizing said first driverless vehicle's on-board computer calculation of said first driverless vehicle's velocity via said on-board contactless speed sensor over said first driverless vehicle's on-board computer calculation of said first driverless vehicle's velocity via said global positioning system receiver.

8. The method of operating a transportation system according to claim 3, wherein said first driverless vehicle comprises an interior passenger compartment having a single passenger seat for a single passenger.

9. The method of operating a transportation system according to claim 8, wherein a ratio between a weight of said first driverless vehicle and said single passenger is substantially 1:1.

10. The method of operating a transportation system according to claim 8, wherein a ratio between a weight of said first driverless vehicle and said single passenger is less than 1:1.

11. The method of operating a transportation system according to claim 8, wherein a ratio between a weight of said first driverless vehicle and said single passenger is less than 2:1.

12. The method of operating a transportation system according to claim 3, wherein said first and second driverless vehicles are operable to traverse said elevated track without an on-board steering mechanism.

13. A transportation system, comprising:
an elevated track comprising:
a plurality of posts,
at least two track members disposed in parallel,
a plurality of cross members transversely disposed and coupled between said at least two track members,
a plurality of reinforcing cross members transversely disposed and coupled between said at least two track members operative to support said at least two track members on said plurality of posts, and
a support member disposed between said plurality of posts and said plurality of reinforcing cross members, wherein said support member comprises a beam disposed parallel with said at least two track members;
a driverless vehicle operatively coupled with to said at least two track members and operable to traverse said elevated track;
a first elevated track loop wherein said driverless vehicle is operable at a first speed;
a second elevated track loop operable to receive said driverless vehicle merging from said first elevated track loop, wherein said driverless vehicle is operable at a second speed; and
an elevated track section operable to receive said driverless vehicle merging from said second elevated track loop, wherein said driverless vehicle is operable at a third speed;
a plurality of switching systems, wherein at least one of said switching systems is located between said first elevated track loop and said second elevated track loop, and wherein at least one of said switching systems is located between said second elevated track loop and said elevated track section;
a flip switching system operable to transfer said driverless vehicle from a first curved section of track to a second curved section of track, wherein said flip switching system comprises:
a drive shaft rotatably coupled with two or more of said plurality of posts;
a first curved track portion fixedly coupled with said drive shaft;
a second curved track portion fixedly coupled with said drive shaft opposite said first curved track portion; and
a motor drive operable to unidirectionally rotate said drive shaft whereby one of said first curved track portion and said second curved track portion are selectively rotated about a longitudinal axis of said drive shaft and aligned with said first curved section of track.

14. The transportation system according to claim 13, further comprising:
a sensor operable to capture a state of said flip switching system, wherein said flip switching system comprises a first travel state, a second travel state, and a transition state; and
a switch computer operable to receive a signal from said sensor.

* * * * *